March 17, 1936.   L. F. MORGAN   2,034,053
TEMPERATURE CONTROL APPARATUS
Filed Nov. 10, 1934

INVENTOR.
Leigh F. Morgan
BY
Walter C. Ross
ATTORNEY.

Patented Mar. 17, 1936

2,034,053

UNITED STATES PATENT OFFICE 2,034,053

TEMPERATURE CONTROL APPARATUS

Leigh F. Morgan, Springfield, Mass.

Application November 10, 1934, Serial No. 752,506

1 Claim. (Cl. 236—92)

This invention relates to improvements in temperature control apparatus.

The principal objects of the invention are directed to the provision of apparatus and a method to control the flow of fluid to a unit by temperature conditions prevailing at the unit.

The inventions of this application are adapted for broad application and are particularly well adapted for use in connection with refrigerating apparatus and the like.

In certain refrigerating apparatus separate coils or pipes, one for a refrigerant and the other for a cooling medium are arranged in heat transfer relation one to the other. The supply or flow of cooling medium such as water has heretofore been controlled by a valve operable by temperatures at the valve. When the temperature of the cooling medium at the valve is elevated to a certain point the valve opens to supply more of the cooling medium and as it cools the valve closes. The said valve which is usually thermostatically operated is placed in series with the pipe or coil and ordinarily at a point after the coil. The valve has a by-pass and cooling medium such as water from the coil is continually flowing through the valve so that the thermostat is subjected to the temperature of the cooling medium.

In this way the valve thermostat is operated by the temperature of the water at the valve and at a point remote from the unit. In this way the temperature at the valve controls the supply of cooling medium rather than the temperature at the unit. This is objectionable not only because the by-passed water is wasted, but the supply thereof is called upon to respond to the water temperature rather than to the temperature requirements at the unit to which the water is supplied. Furthermore, the thermostat is subjected to the deteriorating effects of the water itself.

According to this invention a valve suitable for controlling the flow of the cooling medium to the unit is disposed so as to be subjected to the requirements at the unit and there is no by-passing of water. Thereby waste of water is obviated and at the same time the thermostat is not subjected to the deteriorating effects of the cooling fluid.

Figure 1:
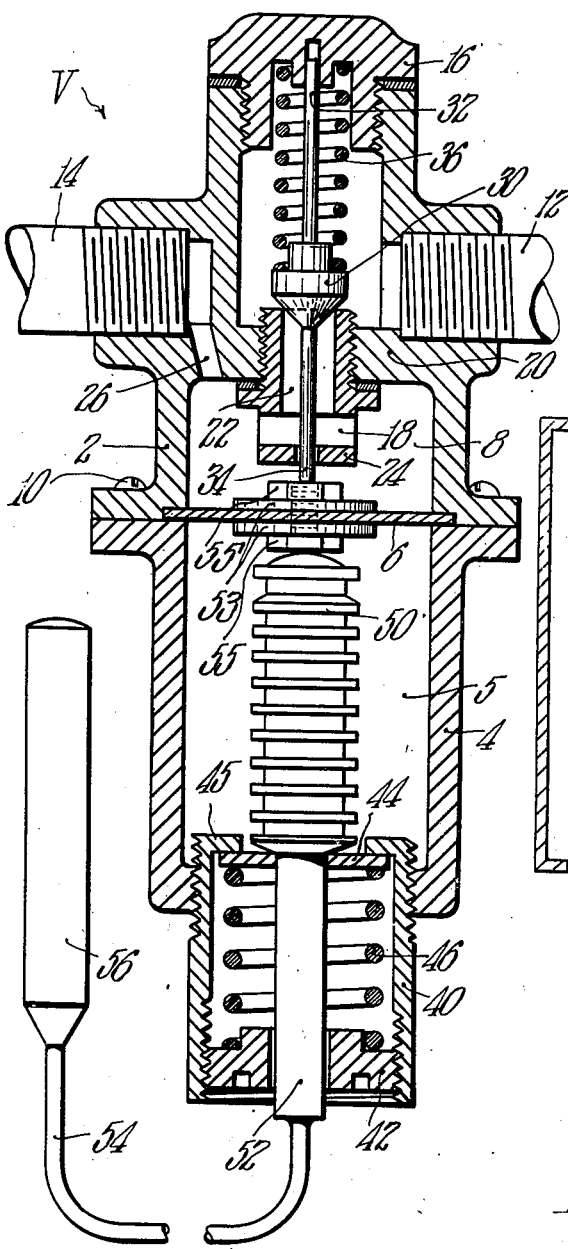
Figure 2:
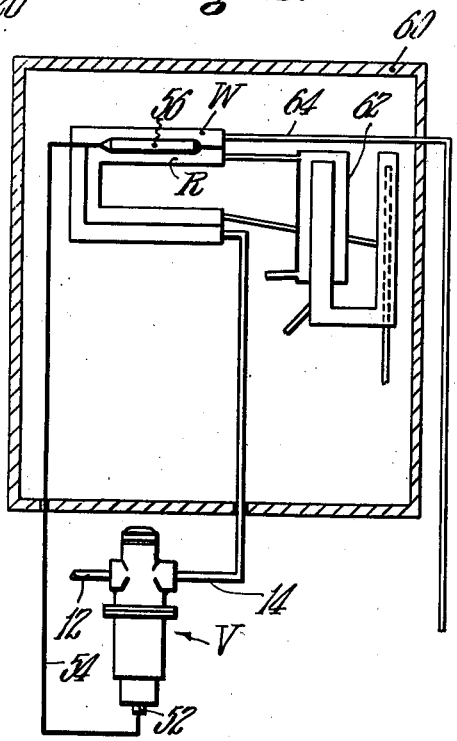

Various and numerous objects and advantages of the invention will be hereinafter more fully referred to in connection with the accompanying drawing wherein:

Fig. 1 is a sectional elevational view through a valve embodying the novel features of the invention; and Fig. 2 is a diagrammatic view to explain certain features of the invention.

The novel features of the invention will now be described in detail with particular reference to the drawing.

The valve V of the invention is clearly shown in section in Fig. 1 and consists of a novel combination and arrangement of parts. A body may consist of upper and lower body parts 2 and 4 which are hollowed out to have a longitudinal chamber or bore which is divided by a flexible wall member such as a diaphargm 6 of rubber or the like. The chamber below the member indicated by 5 may be called the lower or thermostat chamber. The chamber 8 above the diaphragm is separated from the lower chamber by the flexible diaphragm and said diaphragm has its marginal edges clamped between adjacent faces of the members 2 and 4. Screws or bolts 10 secure the body parts 2 and 4 together.

The upper body part 2 is provided with ports such as shown for receiving pipes such as 12 and 14. Preferably the pipe 12 is the inlet and the other 14 is the outlet. The upper end of the part 2 is bored out as shown and a cap 16 is preferably in threaded engagement therewith to seal the upper end thereof.

A bushing 24 is screwed into a web or wall 20 of the body member 2 and has a passageway 22 therein in communication with a passageway 18. A passageway 26 leads from the chamber above the diaphragm to the port at the left which receives pipe 14. These passageways and ports are in communication except for a valve to be described and the passageways 18 and 26 lead into that part of the chamber above the diaphragm.

A tapered valve 30 seats on the upper side of member 24 so as to close passageway 22 and cut off communication between pipes 12 and 14. The valve is tapered as shown to give the best control of the fluid. When the valve 30 is off its seat fluid may pass from pipe 12 through passageways 22, 18 and 26 to pipe 14. It will be noted that when the valve 30 is in the closed position shown, no fluid may pass through the valve.

Upper and lower guides or stems 32 and 34 are associated with the valve 30 which are guided at their end portions in the cap 16 and member 24 as shown to facilitate movements of the valve between open and closed positions. A compression spring 36 is interposed between the cap 16 and the valve 30 and functions to yieldingly hold the valve 30 in its closed position.

An adjustable support for a thermostat is provided at the lower end of the chamber. This preferably includes a sleeve or tube-like member 40 screw-threaded in the body having an adjusting member 42 screw-threaded therein. A thermostat support in the form of a washer 44 is urged upwardly against a stop or flange 45 by a spring 46 between said washer 44 and member 42.

A thermostat 50 in the form of a bellows has its lower end supported by the washer 44 and its upper end acts on the flexible diaphragm 6. An upper threaded part 51 of a bolt 55 passes through the diaphragm 6. A nut 55' is on the end of bolt 55 and washers 53 may be at either side of the diaphragm. A tubular part 52 extends from the lower end of the thermostat 50 and to this is connected a relatively longer and preferably more or less flexible and bendable tube 54 having on its end a hollow bulb 56.

The thermostat 50, tubes 52 and 54, as well as the bulb 56, are so connected and arranged as to constitute a closed system for a heat-responsive substance. Such a substance may include a hydrocarbon or any other substance having a tendency to expand under the influence of heat so that when the bulb is subjected to heat the substance will expand and cause the thermostat to expand longitudinally and act on the diaphragm 6 which acts on valve 30 thereabove.

In the practice of the invention the valve V may be associated with a unit consisting of a coil R containing a refrigerant and a coil W adjacent thereto for a cooling medium such as water and the unit is enclosed in a compartment 60. The valve V preferably has its outlet port connected to the coil W by pipe 14 while its inlet is connected to a water supply line indicated by pipe 12. A waste pipe is represented by 64 and a rectifier usually used in connection with coil R is represented at 62.

In such a unit as shown, the cooling coil is utilized to control the temperature of the other coil. That is, when the temperature of the coil is elevated so as to elevate the temperature of the cooling medium in the other coil to a certain point the heat responsive substance expands so as to bring about elongation or expansion of the thermostat which opens valve 30. As valve 30 opens relatively cool water passes through the valve until the temperature at the bulb is reduced to the point where the heat responsive substance allows the thermostat to contract and valve 30 closes, whereby the flow of water through the valve is stopped. The valve is thus caused to open and close accordingly as the temperature at the bulb increases and decreases.

It will be noted that the operation of the valve and the flow of water therethrough is controlled by the temperature prevailing at the bulb whereby the valve supplies or allows the cooling medium to flow to the coil accordingly as temperature conditions at the coil demand cooling medium.

There is no by-pass associated with the valve for cooling medium to influence the operation of the thermostat and the thermostat is out of contact with the cooling medium. For these reasons there is not necessarily a continuous wasteful flow of water and the thermostat is protected by the diaphragm against injurious action of the cooling medium. The operation of the valve is controlled by temperature conditions prevailing at the unit rather than at the valve itself which insures the desired efficiency in operation.

Should for any reason the temperature at the bulb reach the point where the supply of cooling medium is unable to satisfy the demands therefor and in which case the valve 30 is open and there is a tendency for the thermostat to expand further, the diaphragm brings up against the member 24 and the support for the thermostat yields. In this way the thermostat is protected against injury under the conditions mentioned which may be called abnormal.

Under normal operation the thermostat elongates or expands to operate the valve 30 thereabove but in case the demands for cooling medium exceeds the normal, the thermostat merely elongates against the action of the yieldable support therefor. The valve is urged towards its seat by a spring and requires the action of the diaphragm to open it. The inlet of the valve leads into the chamber above the valve and pressure in inlet pipe 12 does not tend to open the valve but tends to close the valve; thus the valve is under the control of the thermostat at all times.

While I have described my invention in great detail and with respect to a preferred embodiment thereof, I do not desire to be limited to such detail or embodiment since many changes and modifications may be made without departing from the spirit and scope of the invention in its broader aspects. Hence, what I desire to claim as new and secure by Letters Patent of the United States is:

A unitary valve structure comprising in combination, a body having an elongated chamber, a flexible diaphragm across said chamber adjacent its upper end closing off said chamber providing a separate thermostat chamber therebelow, inlet and outlet ports at the upper side of the body, a reciprocable valve operable by said diaphragm to close off communication of said ports and the chamber above the diaphragm, a bellows in the thermostat chamber arranged so that its upper end engages the said diaphragm, supporting means at the lower end of the chamber for said bellows, a tubular part extending from the lower end of the bellows through the supporting means, a tube extending therefrom and a bulb on the end of said tube, the said supporting means including a hollow support member adjustable in the body and in which an apertured member on which the bellows rest is reciprocable and a spring below the apertured member which bears on a lower member adjustable up and down in the support member.

LEIGH F. MORGAN.